(12) United States Patent
Sawamura (10) Patent No.: US 11,556,457 B2
(45) Date of Patent: Jan. 17, 2023

(54) INFORMATION PROCESSING DEVICE, NON-TRANSITORY COMPUTER-READABLE STORAGE MEDIUM FOR STORING APPLICATION STARTUP PROGRAM, AND APPLICATION STARTUP METHOD

(71) Applicant: FUJITSU LIMITED, Kawasaki (JP)

(72) Inventor: Hiroki Sawamura, Ota (JP)

(73) Assignee: FUJITSU LIMITED, Kawasaki (JP)

( * ) Notice: Subject to any disclaimer, the term of this patent is extended or adjusted under 35 U.S.C. 154(b) by 101 days.

(21) Appl. No.: 17/307,659

(22) Filed: May 4, 2021

(65) Prior Publication Data
US 2021/0390034 A1 Dec. 16, 2021

(30) Foreign Application Priority Data

Jun. 12, 2020 (JP) .............................. JP2020-102427

(51) Int. Cl.
| | | |
|---|---|---|
| G06F 11/36 | (2006.01) | |
| G06F 8/75 | (2018.01) | |
| G06F 8/71 | (2018.01) | |
| G06F 9/455 | (2018.01) | |

(52) U.S. Cl.
CPC ............ *G06F 11/3644* (2013.01); *G06F 8/71* (2013.01); *G06F 8/75* (2013.01); *G06F 9/45508* (2013.01); *G06F 11/3604* (2013.01)

(58) Field of Classification Search
CPC .... G06F 11/3604; G06F 8/71; G06F 9/45508; G06F 8/75; G06F 11/3644
USPC ......................................................... 717/130
See application file for complete search history.

(56) References Cited

U.S. PATENT DOCUMENTS

| | | |
|---|---|---|
| 2004/0225952 A1 | 11/2004 | Brown et al. |
| 2010/0325620 A1* | 12/2010 | Rohde ................. G06F 11/3604 717/154 |

FOREIGN PATENT DOCUMENTS

| | | |
|---|---|---|
| JP | 2004-272912 A | 9/2004 |
| JP | 2010-186423 A | 8/2010 |

* cited by examiner

*Primary Examiner* — John Q Chavis
(74) *Attorney, Agent, or Firm* — Fujitsu Patent Center (57) ABSTRACT

A computer-based method of an application startup includes: in response to an instruction to perform a reading processing configured to load an application program, determining whether an analysis result of an annotation included in a source code of the application program is stored in a storage device being non-volatile; and in response to a determination that the analysis result is stored in the storage device, starting the application program by using the analysis result stored in the storage device without executing an analysis processing of the annotation.

15 Claims, 7 Drawing Sheets

INFORMATION PROCESSING DEVICE, NON-TRANSITORY COMPUTER-READABLE STORAGE MEDIUM FOR STORING APPLICATION STARTUP PROGRAM, AND APPLICATION STARTUP METHOD

CROSS-REFERENCE TO RELATED APPLICATION

This application is based upon and claims the benefit of priority of the prior Japanese Patent Application No. 2020-102427, filed on Jun. 12, 2020, the entire contents of which are incorporated herein by reference.

FIELD

The embodiment discussed herein is related to an information processing device, a non-transitory computer-readable storage medium storing an application startup program, and an application startup method.

BACKGROUND

When an application server starts and a deployed application is expanded in memory, an analysis processing for checking whether a program contains a descriptor (in other words, "annotation") intended to reduce the amount of description is performed.

Figure 1:
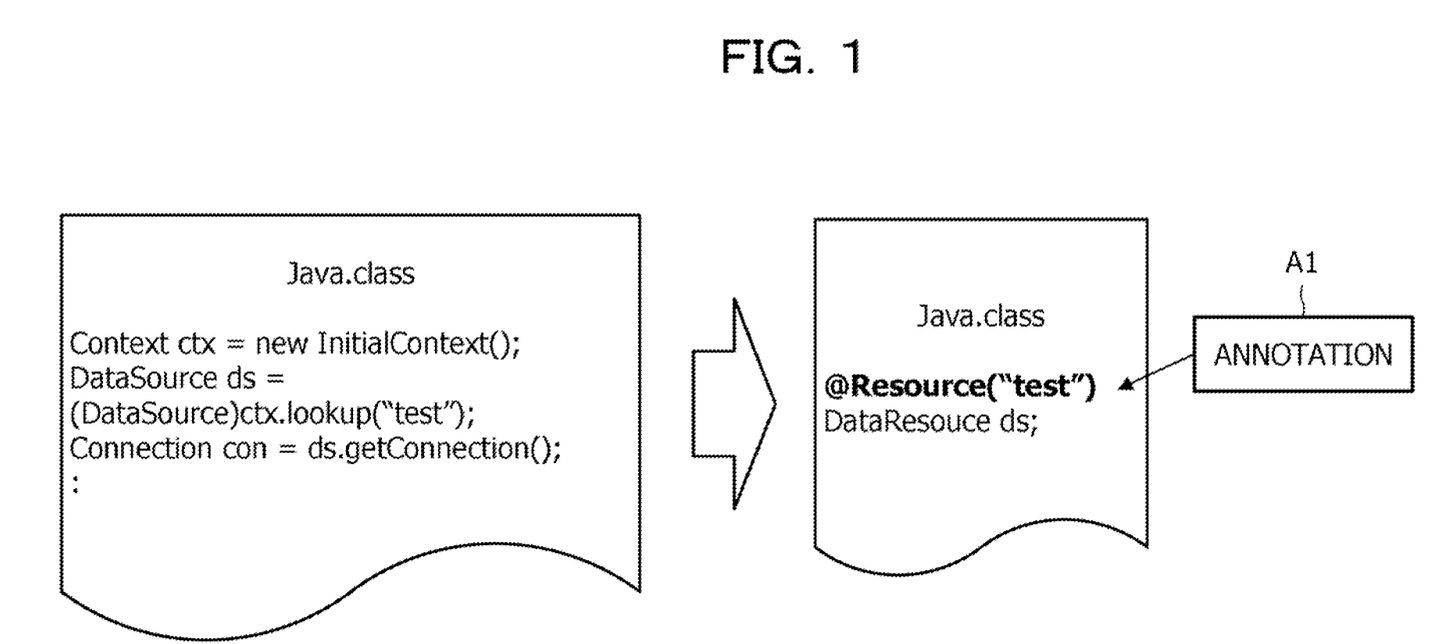
FIG. 1 is a diagram illustrating an example of an annotation in a program.

FIG. 1 is a diagram illustrating an example of an annotation in a program.

As represented by sign A1, when the annotation is inserted in the program (Java.class in the example illustrated in FIG. 1), the amount of description in the program is reduced.

The analysis processing is executed by the application server each time the application is deployed or the application server on which the application has been deployed is started. In addition, the analysis processing time increases in proportion to the amount of the program of the application.

Examples of the related art include Japanese Laid-open Patent Publication No. 2010-186423 and Japanese Laid-open Patent Publication No. 2004-272912.

SUMMARY

According to an aspect of the embodiments, there is provided a computer-based method of an application startup. In an example, the method includes: in response to an instruction to perform a reading processing configured to load an application program, determining whether an analysis result of an annotation included in a source code of the application program is stored in a storage device being non-volatile; and in response to a determination that the analysis result is stored in the storage device, starting the application program by using the analysis result stored in the storage device without executing an analysis processing of the annotation.

The object and advantages of the invention will be realized and attained by means of the elements and combinations particularly pointed out in the claims.

It is to be understood that both the foregoing general description and the following detailed description are exemplary and explanatory and are not restrictive of the invention.

According to one aspect of the embodiment, it is possible to reduce the time between when an information processing device starts up and when it is possible to access an application.

DESCRIPTION OF EMBODIMENTS

For example, in a service provided on the cloud, when a container including an application server is scaled out, in the case of a large-sized application such as a financial system and the like, there is a risk that it takes a long time before the load distribution is actually started by performing the analysis processing. In addition, there is also a risk that the application server may not be started due to a timeout and the scale-out may fail.

According to one aspect of the embodiment, there is provided a solution to reduce the time between when an information processing device starts up and when it is possible to access an application.

[A] Related Example

Figure 2:
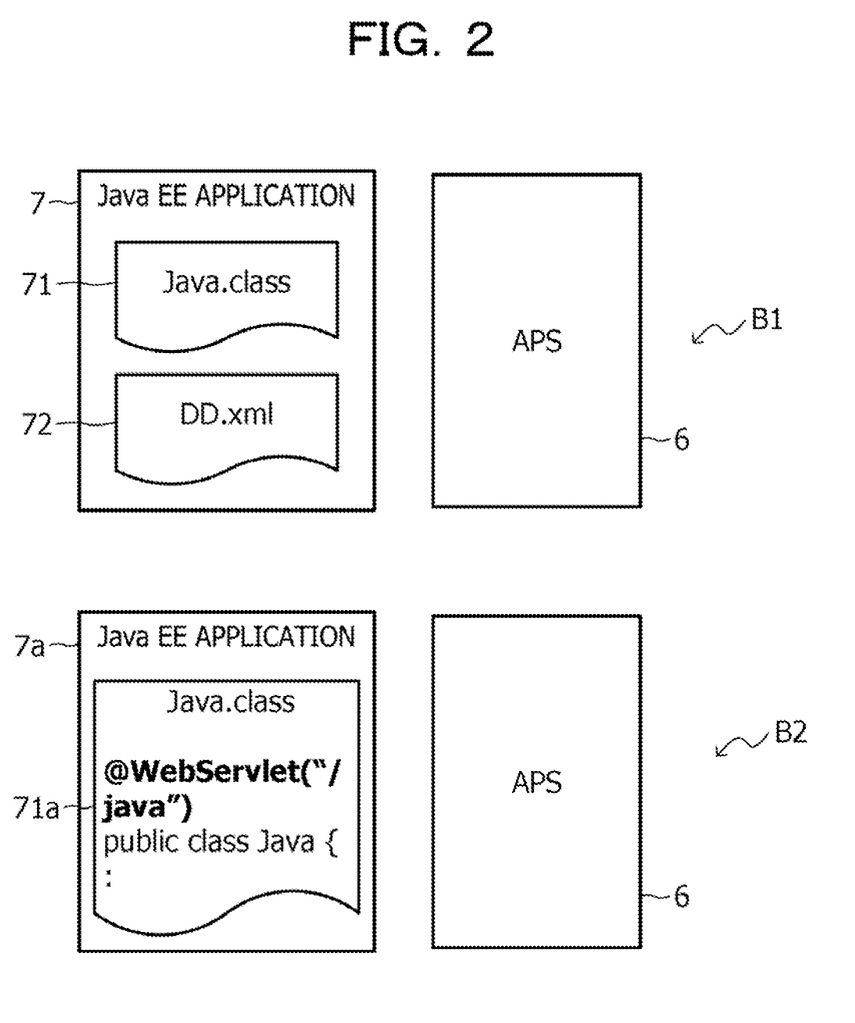
FIG. 2 is a diagram illustrating a program in an application in a related example.

FIG. 2 is a diagram illustrating a program in an application in a related example.

Traditionally, as represented by sign B1 in FIG. 2, a Java (registered trademark) Enterprise Edition application (in other words, "a Java EE application 7") has been a set of a Java.class file 71 and a DD.xml file 72. The Java.class file 71 is a compiled Java binary file, and the DD.xml file 72 is a configuration file for using an extension of an APS 6.

However, in recent years, as represented by sign B2 in FIG. 2, it becomes that an annotation ("@WebServlet("/java")" in the illustrated example) that allows a description of the DD.xml file 72 in a code of a Java.class file 71a is inserted.

When a user deploys a Java EE application 7a compiled with an annotation to the APS 6, the APS 6 parses the Java.class file 71a. Then, when the annotation is detected, APS 6 assembles information corresponding to the DD.xml file 72 and then expands the Java EE application 7a in memory. Note that, since the deployed Java EE application 7a is a compiled binary file, the analysis performed on the Java.class file 71a is not a simple text analysis.

As illustrated in FIG. 1, the annotation is utilized not only to omit the description of DD.xml but also to omit write processing in a Java code originally by a user, so that it becomes easy to develop the Java EE application 7a.

On the other hand, the burden of analysis on the APS 6 side increases, and depending on the scale of the Java EE application 7a, there is a risk that it may take a long time before the application actually becomes accessible.

An analysis processing of the annotation is executed each time the Java EE application 7a is expanded in memory (in other words, each time the Java EE application 7a is deployed to the APS 6) and each time APS 6 is restarted.

Here, if redeployment of the Java EE application 7a and restart of the APS 6 are limited to a case when regular maintenance and an accident occurs, the frequency of the analysis processing of the annotation also becomes low.

However, as the cloud emerges and becomes popular, dynamic scale-in and scale-out may be performed for efficient operation of resources on the cloud in some cases.

Figure 3:
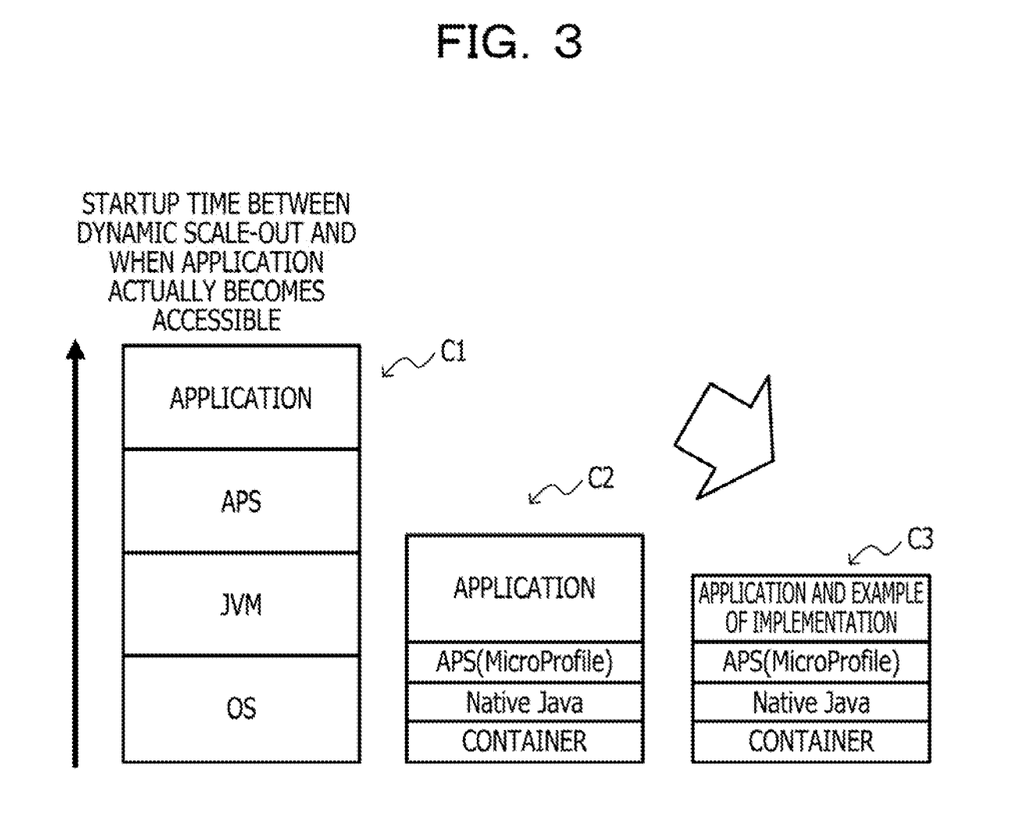
FIG. 3 is a diagram comparing startup times in a related example and an example of an embodiment.

FIG. 3 is a diagram comparing startup times in a related example and an example of an embodiment.

A technology that shortens a processing time of an operating system (OS), a Java virtual machine (JVM), the APS, and an application as represented by sign C1 in FIG. 3 to a processing time of a container, native Java, APS (micro profile), and application as represented by sign C2 has been developed.

However, especially in the case of a large-scale application operated in a mission-critical area, there is a risk that the analysis processing of the annotation may become a bottleneck.

Therefore, in an example of the embodiment, as represented by sign C3, the time between when an APS 1 (described later with reference to FIG. 4) starts and when the application actually becomes accessible is shortened by improving the analysis processing in the application.

[A] Embodiment

Hereinafter, an embodiment will be described with reference to the drawings. However, the embodiment to be described below is merely an example, and there is no intention to exclude the application of various modifications and techniques not explicitly described in the embodiment. For example, this means that the present embodiment may be modified in various ways to be implemented without departing from the spirit of the embodiment. In addition, each drawing is not intended to include only the constituent elements illustrated in the drawing and may include other functions and the like.

Hereinafter, in the drawings, each of the same signs represents a similar part, and thus description thereof will be omitted.

Figure 4:
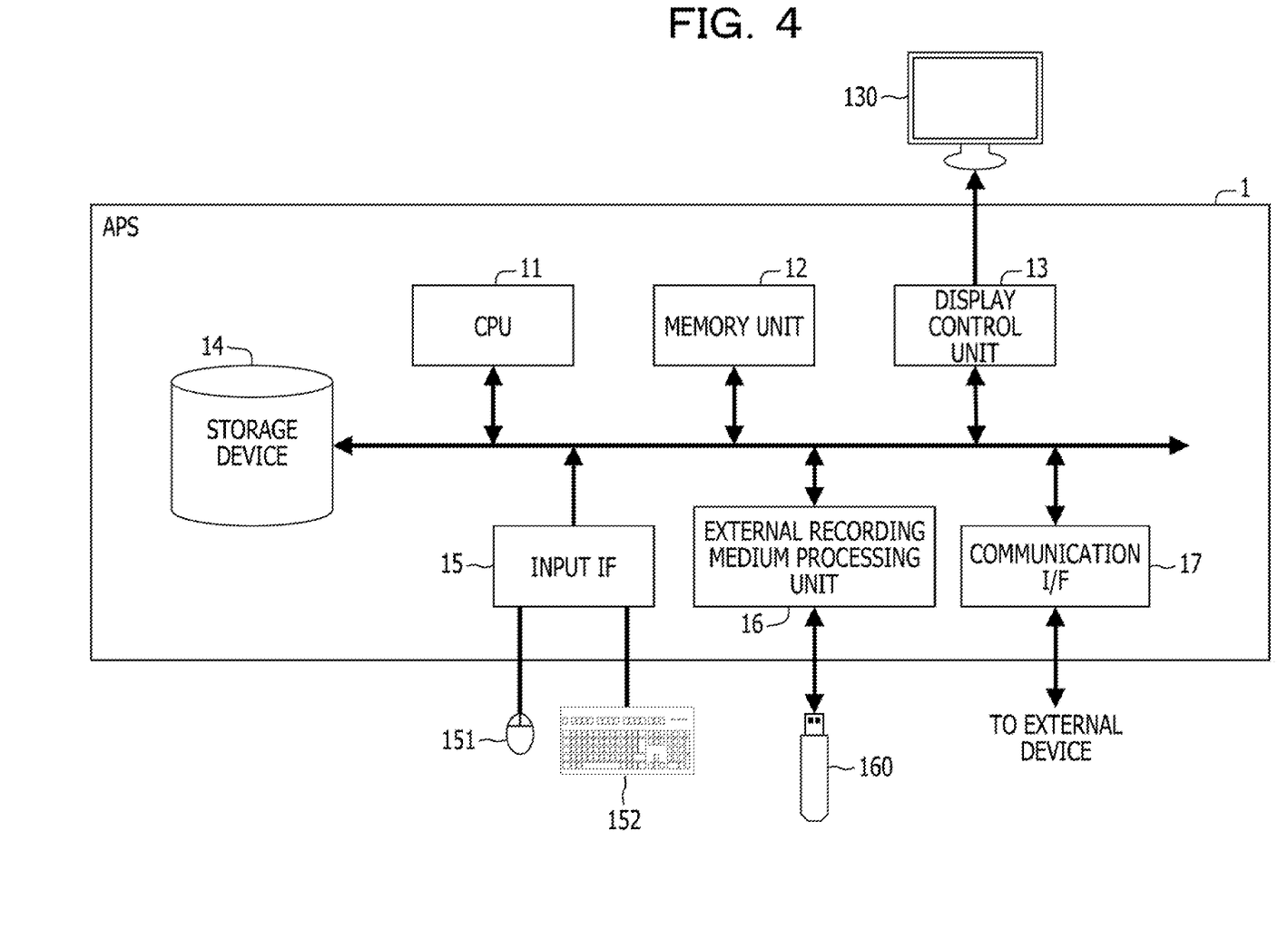
FIG. 4 is a block diagram schematically illustrating a hardware configuration example of an application server (APS) in an example of an embodiment.

FIG. 4 is a block diagram schematically illustrating a hardware configuration example of an APS 1 in an example of an embodiment.

As illustrated in FIG. 4, the APS 1 is an example of an information processing device, which includes a central processing unit (CPU) 11, a memory unit 12, a display control unit 13, a storage device 14, an input interface (IF) 15, an external recording medium processing unit 16, and a communication IF 17.

The memory unit 12 is an example of a storage unit, which is, for example, a read only memory (ROM), a random access memory (RAM), and the like. Note that the memory unit 12 may be a dynamic random access memory (DRAM). Programs such as a basic input/output system (BIOS) may be written into the ROM of the memory unit 12. A software program of the memory unit 12 may be appropriately read and executed by the CPU 11. In addition, the RAM of the memory unit 12 may be used as a temporary recording memory or a working memory.

The display control unit 13 is connected to a display device 130 and controls the display device 130. The display device 130 is a liquid crystal display, an organic light-emitting diode (OLED) display, a cathode ray tube (CRT), an electronic paper display, or the like, and displays various kinds of information for an operator or the like. The display device 130 may be combined with an input device and may be, for example, a touch panel.

The storage device 14 is a storage device having high input/output (IO) performance, and for example, a solid state drive (SSD), a storage class memory (SCM), and a hard disk drive (HDD) may be used.

The input IF 15 may be connected to an input device such as a mouse 151 and a keyboard 152, and may control the input device such as the mouse 151 and the keyboard 152. The mouse 151 and the keyboard 152 are examples of the input devices, and an operator performs various kinds of input operation through these input devices.

The external recording medium processing unit 16 is configured so that a recording medium 160 may be attached thereto. The external recording medium processing unit 16 is configured to be capable of reading information recorded in the recording medium 160 when the recording medium 160 is attached thereto. In the present example, the recording medium 160 is portable. For example, the recording medium 160 is a flexible disk, an optical disk, a magnetic disk, a magneto-optical disk, a semiconductor memory, or the like.

The communication IF 17 is an interface for enabling communication with an external device.

The CPU 11 is a processing device that performs various types of control and calculation, and implements various functions by executing the OS and program stored in the memory unit 12.

A device for controlling the behavior of the entire APS 1 is not limited to the CPU 11 and may be, for example, any one of an MPU, a DSP, an ASIC, a PLD, and an FPGA. In addition, the device for controlling the behavior of the entire APS 1 may be a combination of two or more of the CPU, the MPU, the DSP, the ASIC, the PLD, and the FPGA. Note that the MPU is an abbreviation for a micro processing unit, the DSP is an abbreviation for a digital signal processor, and the ASIC is an abbreviation for an application-specific integrated circuit. In addition, the PLD is an abbreviation for a programmable logic device, and the FPGA is an abbreviation for a field-programmable gate array.

Figure 5:
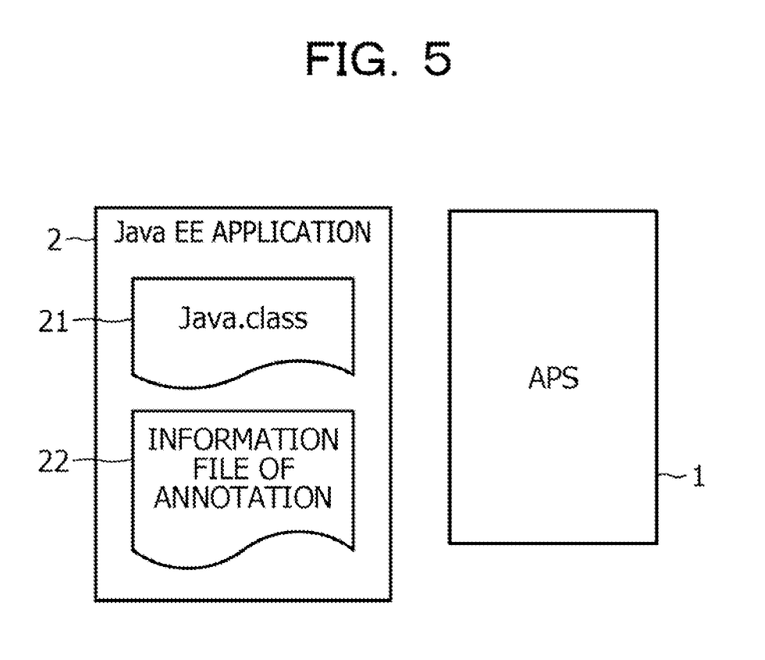
FIG. 5 is a diagram illustrating an example of an application in the APS illustrated in FIG. 4.

FIG. 5 is a diagram illustrating an example of an application in the APS 1 illustrated in FIG. 4.

An enterprise Java application (in other words, "a Java EE application 2") executed on the APS 1 is stored in a storage device 14, for example, and includes a Java.class file 21 and an information file of annotation 22.

The Java.class file 21 is a compiled Java binary file.

The information file of annotation 22 includes an attribute value indicating whether or not the annotation is to be updated, as will be described later with reference to FIG. 6.

Figure 6:
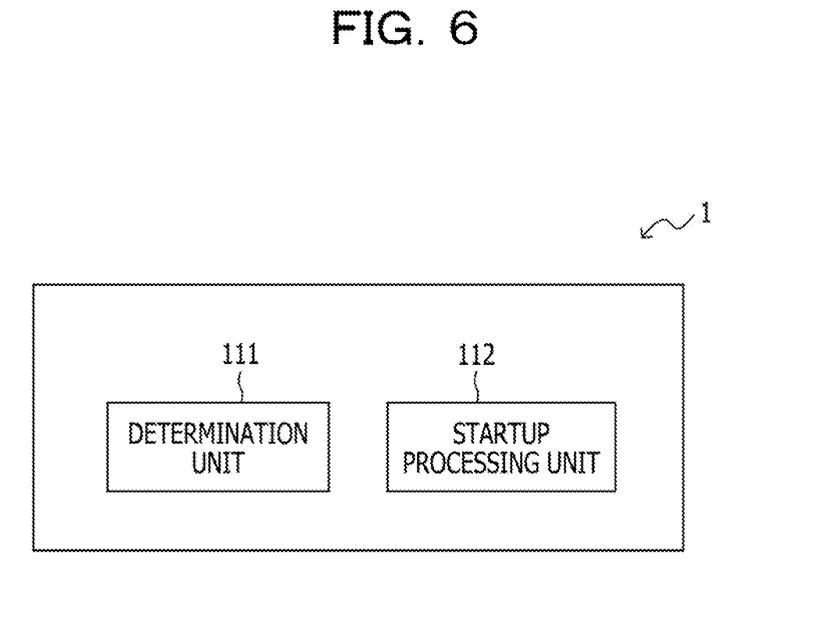
FIG. 6 is a block diagram schematically illustrating a software configuration example of the APS illustrated in FIG. 4.

FIG. 6 is a block diagram schematically illustrating a software configuration example of the APS 1 illustrated in FIG. 4;

The CPU 11 functions as a determination unit 111 and a startup processing unit 112.

The determination unit 111 checks whether the information file of annotation 22 is included in the Java EE application 2 when the APS 1 expands the Java EE application 2 in the memory unit 12 (in other words, when the Java EE application 2 is deployed or when the deployed APS 1 is started).

In other words, the determination unit 111 determines whether an analysis result of the annotation included in the Java.class file 21 of the Java EE application 2 is stored in the non-volatile storage device 14 in response to the reading processing of the Java EE application 2.

The startup processing unit 112 follows a policy of updating the information of annotation when the Java EE application 2 includes the information file of annotation 22 and omits the analysis processing of the annotation when it is not necessary to update the annotation. Then, the startup processing unit 112 expands the Java EE application 2 in the memory unit 12 based on the contents of the information file of annotation 22 included in the Java EE application 2.

In other words, when it is determined that the analysis result is stored in the storage device 14, the startup processing unit 112 starts the Java EE application 2 based on the analysis result stored in the storage device 14 without executing the analysis processing of the annotation.

When performing the analysis processing of the annotation, the startup processing unit 112 injects the analyzed information file of annotation 22 into an archive file of the Java EE application 2 so as to be able to be referred to at the next and upcoming startup.

As the update policy of the information file of annotation 22, it is possible to provide an attribute value that may be set for each Java EE application 2 on the APS 1. Regarding the attribute value, for example, a value "−1" may be set when not updating, a value "0" may be set when updating, and a value "1" or above (arbitrary time) may be set when updating after a predetermined time or more has passed from the update date and time of the information file of annotation 22. If there is no setting by the user, a value "0" is to be set as the attribute value.

Even when it is determined that the analysis result is stored in the storage device 14, the startup processing unit 112 executes the analysis processing when the update policy of the information file of annotation 22 is set to be valid.

Therefore, it is possible to improve the startup performance of the Java EE application 2 from the second time onward without rewriting the existing Java EE application 2. In particular, when dynamic scale-out is performed, it is possible to reduce the startup time of the Java EE application 2 significantly.

[A-2] Operation

Figure 7:
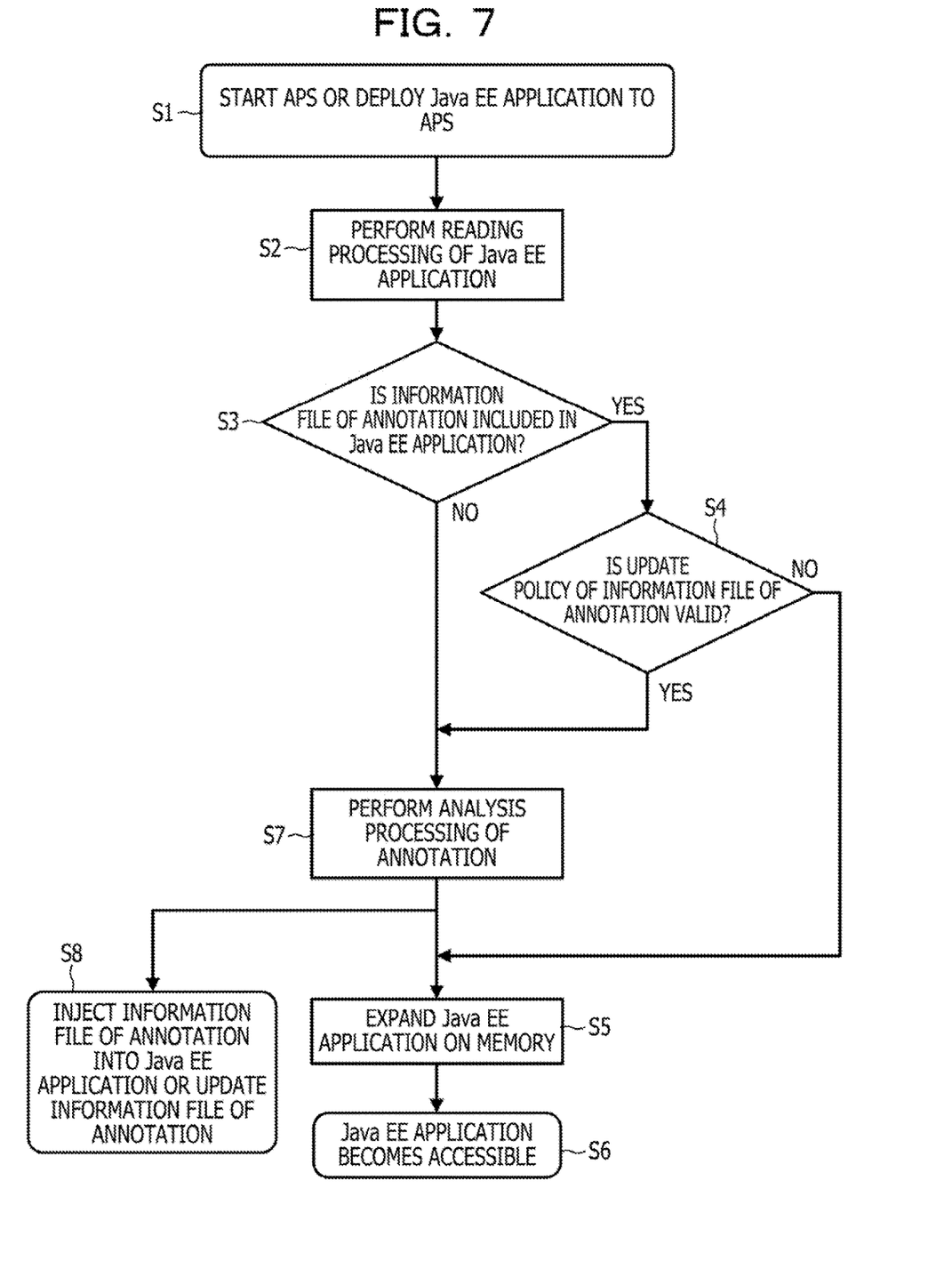
FIG. 7 is a flowchart illustrating a startup processing in the APS illustrated in FIG. 4.

The startup processing in the APS 1 illustrated in FIG. 4 will be described with reference to the flowchart (steps S1 to S8) illustrated in FIG. 7.

The APS 1 is started, or the Java EE application 2 is deployed on the APS 1 (step S1).

The startup processing unit 112 executes the reading processing of the Java EE application 2 (step S2).

The determination unit 111 determines whether the Java EE application 2 includes the Information file of annotation 22 (step S3).

If the Java EE application 2 does not include the information file of annotation 22 (see the NO route in step S3), the processing proceeds to step S7.

On the other hand, if the Java EE application 2 includes the information file of annotation 22 (see the YES route in step S3), the determination unit 111 determines whether the update policy of the information file of annotation 22 is valid (step S4).

If the update policy of the information file of annotation 22 is valid (see YES route in step S4), the processing proceeds to step S7.

On the other hand, if the update policy of the information file of annotation 22 is not valid (see NO route in step S4), the startup processing unit 112 expands the Java EE application 2 in the memory unit 12 (step S5).

Then, the Java EE application 2 becomes accessible (step S6), and the processing ends.

If the Java EE application 2 does not include the information file of annotation 22 in step S3 or if the update policy of the information file of annotation 22 is valid in step S4, the startup processing unit 112 performs the analysis processing of the annotation (step S7).

Then, in parallel with the processing illustrated in step S5, the startup processing unit 112 injects the information file of annotation 22 into the Java EE application 2 or updates the information file of annotation 22 in the Java EE application 2 (step S8). The processing of injecting or updating the information file of annotation 22 is performed for the next and upcoming startup and not directly related to the deployment processing of the Java EE application 2, so it may be performed asynchronously in a separate thread.

By executing the processing in the order of steps S1, S2, S3, S4, S5, and S6, it is possible to avoid the analysis processing of the annotation (step S7), which takes a very long time depending on the scale of the Java EE application 2. Then, it is possible to shorten the startup time of the Java EE application 2 compared to the case that the processing is executed in the order of steps S1, S2, S3, S7, S5, and S6.

[A-3] Effect

According to the application startup program, the APS 1, and the application startup method in the example of the embodiment described above, for example, it is possible to obtain the following effects.

The determination unit 111 determines whether the analysis result of the annotation included in the Java.class file 21 of the Java EE application 2 is stored in the non-volatile storage device 14 in response to the reading processing of the Java EE application 2. When it is determined that the analysis result is stored in the storage device 14, the startup processing unit 112 starts the Java EE application 2 based on the analysis result stored in the storage device 14 without executing the analysis processing of the annotation.

Therefore, it is possible to shorten the time between when the APS 1 starts and when the application becomes accessible. In addition, it is possible to shorten the time between the scale-out of the APS 1 and when the application actually becomes accessible.

The analysis result is included in the archive file of the Java EE application 2 in the storage device 14. Therefore, it is possible to read out the analysis result in a short time.

When it is determined that the analysis result is not stored in the storage device 14, the startup processing unit 112 executes the analysis processing. Therefore, it is possible to start the Java EE application 2 even when the analysis result of the annotation is not stored.

Even when it is determined that the analysis result is stored in the storage device 14, the startup processing unit 112 executes the analysis processing when the update policy of the information file of annotation 22 is set to be valid. Therefore, it is possible to start the Java EE application normally even when it is preferable to execute the analysis processing of the annotation every time or periodically at the time of startup.

When the analysis processing is executed, the startup processing unit 112 stores the result of the analysis processing in the storage device 14. Therefore, it is possible to shorten the startup time at the next startup.

[B] Others

The disclosed technique is not limited to the embodiment described above, and various modifications may be made without departing from the spirit of the present embodiment. Each of the configurations and each of the processing according to the present embodiment may be selected as needed or may be combined as appropriate.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing device comprising:
   a memory; and
   a processor coupled to the memory, the processor being configured to perform processing, the processing including:
   in response to an instruction to perform a reading processing configured to load an application program, determining whether an analysis result of an annotation included in a source code of the application program is stored in a storage device being non-volatile; and
   in response to a determination that the analysis result is stored in the storage device, starting the application program by using the analysis result stored in the storage device without executing an analysis processing of the annotation.

2. The infatuation processing device according to claim 1, wherein the analysis result is included in an archive file of the application in the storage device.

3. The information processing device according to claim 1, the processing further comprising:
   in response to a determination that the analysis result is not stored in the storage device, executing the analysis processing.

4. The information processing device according to claim 1, the processing further comprising:
   in response to a determination that an update policy of an information file of the annotation is set to be valid, executing the analysis processing even when it is determined that the analysis result is stored in the storage device.

5. The information processing device according to claim 3, the processing further comprising:
   in response to the executing of the analysis processing, storing a result of the analysis processing in the storage device.

6. A non-transitory computer-readable storage medium for storing an application startup program which causes a processor to perform processing, the processing comprising:
   in response to an instruction to perform a reading processing configured to load an application program, determining whether an analysis result of an annotation included in a source code of the application program is stored in a storage device being non-volatile; and
   in response to a determination that the analysis result is stored in the storage device, starting the application program by using the analysis result stored in the storage device without executing an analysis processing of the annotation.

7. The non-transitory computer-readable storage medium according to claim 6, wherein the analysis result is included in an archive file of the application program in the storage device.

8. The non-transitory computer-readable storage medium according to claim 6, the processing further comprising:
   in response to a determination that the analysis result is not stored in the storage device, executing the analysis processing.

9. The non-transitory computer-readable storage medium according to claim 6, the processing further comprising:
   in response to a determination that an update policy of an information file of the annotation is set to be valid, executing the analysis processing even when it is determined that the analysis result is stored in the storage device.

10. The non transitory computer-readable storage medium according to claim 8, the processing further comprising:
    in response to the executing of the analysis processing, storing a result of the analysis processing in the storage device.

11. A computer-based method of an application startup, the method comprising:
    in response to an instruction to perform a reading processing configured to load an application program, determining whether an analysis result of an annotation included in a source code of the application program is stored in a storage device being non-volatile; and
    in response to a determination that the analysis result is stored in the storage device, starting the application program by using the analysis result stored in the storage device without executing an analysis processing of the annotation.

12. The computer-based method according to claim 11, wherein the analysis result is included in an archive file of the application in the storage device.

13. The computer-based method according to claim 11, the processing further comprising:
    in response to a determination that the analysis result is not stored in the storage device, executing the analysis processing.

14. The computer-based method according to claim 11, the processing further comprising:
    in response to a determination that an update policy of an information file of the annotation is set to be valid, executing the analysis processing even when it is determined that the analysis result is stored in the storage device.

15. The computer-based method according to claim 13, the processing further comprising:
    in response to the executing of the analysis processing, storing a result of the analysis processing in the storage device.

* * * * *